(12) United States Patent
Park et al.

(10) Patent No.: US 9,781,704 B2
(45) Date of Patent: Oct. 3, 2017

(54) METHOD AND APPARATUS FOR CONTROL CHANNEL DECODING IN MULTI-NODE SYSTEM

(71) Applicant: LG ELECTRONICS INC., Seoul (KR)

(72) Inventors: Sung Ho Park, Anyang-si (KR); Jin Young Chun, Anyang-si (KR); Ki Tae Kim, Anyang-si (KR); Su Nam Kim, Anyang-si (KR); Ji Won Kang, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 14/353,466

(22) PCT Filed: Oct. 23, 2012

(86) PCT No.: PCT/KR2012/008701
§ 371 (c)(1),
(2) Date: Apr. 22, 2014

(87) PCT Pub. No.: WO2013/062281
PCT Pub. Date: May 2, 2013

(65) Prior Publication Data
US 2014/0286285 A1    Sep. 25, 2014

Related U.S. Application Data

(60) Provisional application No. 61/550,436, filed on Oct. 23, 2011.

(51) Int. Cl.
*H04W 72/04* (2009.01)
*H04L 27/00* (2006.01)
(Continued)

(52) U.S. Cl.
CPC ....... *H04W 72/0406* (2013.01); *H04L 1/0038* (2013.01); *H04L 1/0025* (2013.01); *H04L 5/0053* (2013.01); *H04L 27/0008* (2013.01)

(58) Field of Classification Search
CPC .................... H04L 1/0038; H04W 72/0406
See application file for complete search history.

(56) References Cited

U.S. PATENT DOCUMENTS

2010/0279628 A1   11/2010  Love et al.
2011/0249633 A1*  10/2011  Hong ................... H04L 5/0053
                                                      370/329
(Continued)

FOREIGN PATENT DOCUMENTS

KR   10-2009-0083269 A    8/2009
KR   10-2010-0110272 A   10/2010
WO      2011/000440 A1    1/2011

OTHER PUBLICATIONS

NG U.S. Pat. No. 8488546.*

*Primary Examiner* — Donald Mills
*Assistant Examiner* — Henry Baron
(74) *Attorney, Agent, or Firm* — Dentons US LLP

(57) ABSTRACT

Provided are a method and an apparatus for control channel decoding of a terminal in a multi-node system. The method sets a search space for searching a control channel and can perform the decoding by using different demodulation methods according to aggregation levels capable of constituting the control channel within the search space. In addition, the method determines the DCI format to be searched according to a transmission mode and can use different demodulation methods according to the determined DCI format. Furthermore, the method modulates DCI format to a first modulation degree when demodulating the DCI format, and can (Continued)

demodulate the DCI format to a second modulation degree when the DCI format is not detected.

2 Claims, 14 Drawing Sheets

(51) Int. Cl.
*H04L 1/00* (2006.01)
*H04L 5/00* (2006.01)

(56) References Cited

U.S. PATENT DOCUMENTS

| | | | | |
|---|---|---|---|---|
| 2011/0249640 | A1* | 10/2011 | Soong | H04B 7/2606 370/329 |
| 2011/0292891 | A1* | 12/2011 | Hsieh | H04L 5/001 370/329 |
| 2012/0163437 | A1* | 6/2012 | Frederiksen | H04L 5/001 375/224 |
| 2013/0003663 | A1* | 1/2013 | Blankenship | H04L 5/0053 370/329 |
| 2013/0039284 | A1* | 2/2013 | Marinier | H04L 5/001 370/329 |

\* cited by examiner

METHOD AND APPARATUS FOR CONTROL CHANNEL DECODING IN MULTI-NODE SYSTEM

This application is a National Stage entry of International Application No. PCT/KR2012/008701, filed on Oct. 23, 2012, which claims priority to U.S. Provisional Application No. 61/550,436 filed Oct. 23, 2011, both of which are incorporated by reference herein in their entirety.

BACKGROUND OF THE INVENTION

Field of the Invention

The present invention relates to wireless communication, and more particularly, to a method and device for a control channel decoding in a multi-node system.

Related Art

Recently, the amount of transmission of data of a wireless communication network is on a rapid increase. This is because various devices such as a smart phone and a tablet PC which require machine-to-machine (M2M) communication and a large amount of data transmission appear and are distributed. In order to satisfy the high amount of transmission of data, a carrier aggregation technology which efficiently uses more frequency bands, a cognitive radio technology, etc., are drawing attention, and in order to increase the data capacity within limited frequencies, a multi-antenna technology, a multi base station cooperation technology, etc. are drawing attention.

Furthermore, the wireless communication network is evolving in a direction that the density of nodes, which may have an access to the area around the user, increases. Here, a node may refer to an antenna or antenna group which is placed away by more than a certain interval from a distributed antenna system (DAS), but the meaning of the node may be extended. That is, the node may be a picocell base station (PeNB), a home base station (HeNB), a remote radio head (RRH), a remote radio unit (RRU), a relay, etc. The wireless communication system may show a higher system performance by cooperation between nodes. That is, if each node operates like an antenna or antenna group for one cell by transmission and reception management by one control station, a much superior system performance may be shown. Hereinafter, a wireless communication including a plurality of nodes is called a multi-node system.

A node may be applied even if defined not only as an antenna group which is placed away by more than a certain interval, but also as an arbitrary antenna group regardless of an interval. For example, the base station composed of a Gloss polarized antenna may be formed of a node composed of a H-pol antenna and a node composed of a V-pol antenna.

Furthermore, in a multi-node system, a new control channel may be used due to inter-cell interference and an insufficient capacity in the existing control channel, etc. In the existing control channel, decoding was possible based on a cell-specific reference signal (CRS) which may be received by all user equipments (UEs), but in a new control channel, decoding may be possible based on a user equipment-specific reference signal (URS). The new control channel may be allocated to the data region among the control region and the data region in the subframe. In the $3^{rd}$ generation partnership project (3GPP) long term evolution (LTE)/LTE-A(advanced), the existing control channel is called a physical downlink control channel (PDCCH) and a new control channel is called an enhanced-PDCCH (E-PDCCH).

In the existing control channel, control channel element (CCE) units have been used allocation, but in a new control channel such as E-PDCCH, the resource allocation unit may be the resource block (RB). That is, a greater resource allocation unit maybe used.

In this case, a new control channel may transmit a control signal through more wireless resources compared to the existing control channel, and thus a greater coding gain may be obtained, and an additional beam gain may be obtained through beam forming.

Considering the above, if a control signal is transmitted in a new control channel using a modulation scheme as in the existing control channel, the operation may be performed at an unnecessarily high signal to interference plus noise ratio (SINR). Hence, the modulation scheme in a new control channel introduced in the multi-node system is an issue, and from the perspective of the UE, the modulation/decoding scheme of a new control channel is an issue.

SUMMARY OF THE INVENTION

An object of the present invention is to provide a method and apparatus for decoding a control channel in a multi-node system.

In accordance with an aspect of the present invention, a method of decoding a control channel of a user equipment (UE) in a multi-node system includes setting a search space for searching for a control channel, the search space being included within a data region from among a control region including initial N (N is an integer which is one of 0 to 4) orthogonal frequency division multiplexing (OFDM) symbols and a data region including remaining OFDM symbols in a subframe including a plurality of OFDM symbols, attempting decoding using a first aggregation level, from among aggregation levels which may form the control channel within the search space, as a unit, and attempting decoding using a second aggregation level, from among the aggregation levels within the search space, as a unit, wherein the decoding is attempted in a first demodulation scheme when the decoding is attempted using the first aggregation level as the unit, and the decoding is attempted in a second demodulation scheme when the decoding is attempted using the second aggregation level as the unit.

In accordance with another aspect of the present invention, a method of decoding a control channel of a user equipment (UE) in a multi-node system includes receiving mode information which reveals a downlink transmission mode and an uplink transmission mode, determining a plurality of downlink control information (DCI) formats to be searched according to the mode information, demodulating DCI formats belonging to a first DCI format set, from among the plurality of DCI formats, in a first demodulation scheme, and demodulating DCI formats belonging to a second DCI format set, from among the plurality of DCI formats, in a second demodulation scheme.

In accordance with another aspect of the present invention, a user equipment (UE) for decoding a control channel in a multi-node system includes a radio frequency (RF) unit which transmits and receives a wireless signal, and a processor connected to the RF unit, wherein the processor sets a search space for searching for a control channel, the search space being included within a data region from among a control region including initial N (N is an integer which is one of 0 to 4) orthogonal frequency division multiplexing (OFDM) symbols and a data region including remaining OFDM symbols in a subframe including a plurality of OFDM symbols, attempts decoding using a first aggregation level, from among aggregation levels which may form the control channel within the search space, as a unit, and attempts decoding using a second aggregation level, from among the aggregation levels within the search space, as a unit, wherein the decoding is attempted in a first demodulation scheme when the decoding is attempted using the first aggregation level as the unit, and the decoding is attempted in a second demodulation scheme when the decoding is attempted using the second aggregation level as the unit.

In accordance with another aspect of the present invention, a user equipment (UE) for decoding a control channel in a multi-node system includes a radio frequency (RF) unit which transmits and receives a wireless signal, and a processor connected to the RF unit, wherein the processor receives mode information which reveals a downlink transmission mode and an uplink transmission mode, determines a plurality of downlink control information (DCI) formats to be searched according to the mode information, demodulates DCI formats belonging to a first DCI format set, from among the plurality of DCI formats, in a first demodulation scheme, and demodulates DCI formats belonging to a second DCI format set, from among the plurality of DCI formats, in a second demodulation scheme.

When the existing DCI formats are transmitted through the E-PDCCH in the multi-node system, the DCI formats are transmitted by applying a high order modulation degree, and a new single DCI format combined with a plurality of existing DCI formats may be transmitted. According to the present invention, The E-PDCCH may be decoded without increasing the blind decoding overhead or while increasing the blind decoding overhead to the minimum. Furthermore, the resource efficiency of the E-PDCCH may be increased.

DESCRIPTION OF EXEMPLARY EMBODIMENTS

A user equipment (UE) may be fixed or mobile, and may also be called a mobile station (MS), a mobile terminal (MT), a user terminal (UT), a subscriber station (SS), a wireless device, a personal digital assistant (PDA), a wireless modem, a handheld device, etc.

A base station generally refers to a fixed station which communicates with a UE, and may also be called an evolved-NodeB (eNB), a base transceiver system (BTS), an access point, etc.

Hereinafter, the application of the present invention based on the 3GPP LTE based on $3^{rd}$ generation partnership project (3GPP) technical specification (TS) release 8 and 3GPP LTE-A based on 3GPP TS release 10 will be described. However, these are merely examples, and the present invention may be applied to various wireless communication networks.

In order to improve the performance of the wireless communication system, the technology is evolving in a direction that increases the density of the node which may be connected to the area around the user. The performance of the wireless communication system with a high node density may be improved by cooperation between nodes. The wireless communication system including a plurality of nodes, which are connected to the base station in a wired manner and are distributed, is called a multi-node system.

Figure 1:
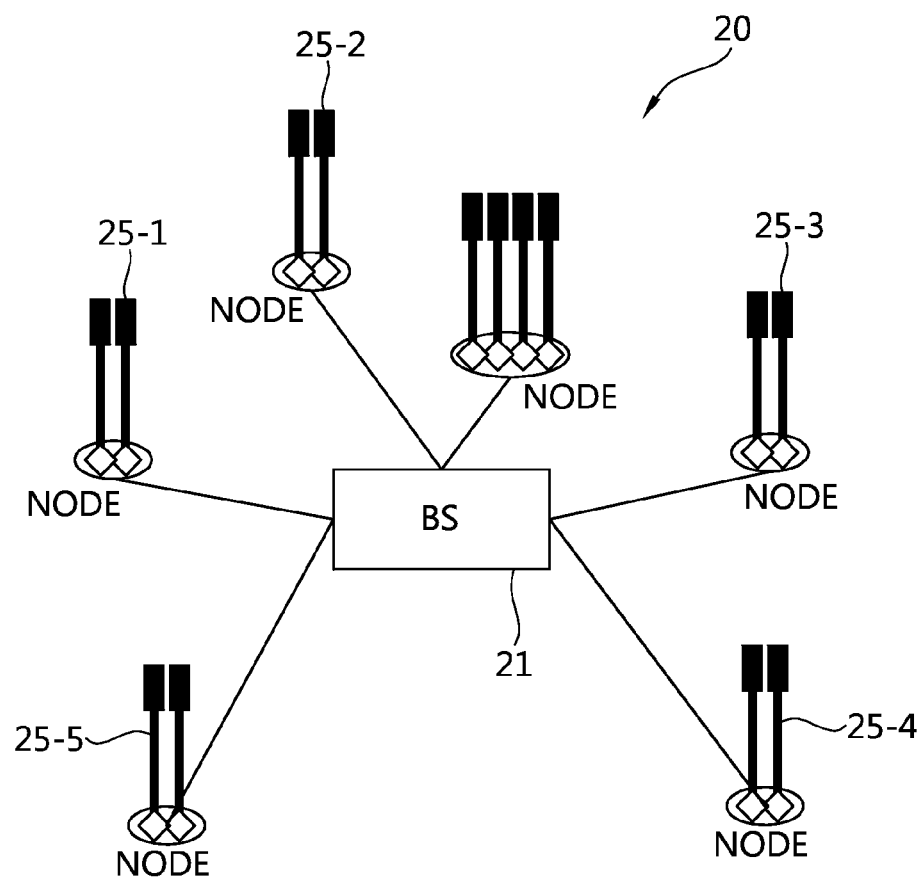
FIG. 1 shows an example of a multi-node system.

FIG. 1 shows an example of a multi-node system.

Referring to FIG. 1, the multi-node system 20 may include one base station 21 and a plurality of nodes 25-1, 25-2, 25-3, 25-4, and 25-5. The plurality of nodes 25-1, 25-2, 25-3, 25-4, and 25-5 may be managed by one base station 21. That is, the plurality of nodes 25-1, 25-2, 25-3, 25-4, and 25-5 may operate as if they were a part of one cell. At this time, each node 25-1, 25-2, 25-3, 25-4, or 25-5 may be allocated a separate node ID or may operate like some antenna groups within the cell without a separate node ID. In such a case, the multi-node system 20 of FIG. 1 may be considered as a distributed multi-node system (DMNS) which forms one cell.

Furthermore, a plurality of nodes 25-1, 25-2, 25-3, 25-4, and 25-5 may perform scheduling and handover (HO) of the UE with individual cell IDs. In such a case, the multi-node system 20 of FIG. 1 may be considered as a multi-cell system. The base station 21 may be a macro cell, and each node may be a femto cell or a pico cell having a cell coverage smaller than a cell coverage of the macro cell. Likewise, when the plurality of cells are overlaid according to the coverage, the network may be called a multi-tier network.

In FIG. 1, each node 25-1, 25-2, 25-3, 25-4, or 25-5 may be one of a base station, a Node-B, an eNode-B, a pico cell eNb (PeNB)), a home eNB (HeNB), a radio remote head (RRH), a relay station (RS) or repeater, and a distributed antenna. At least one antenna may be installed at one node. Furthermore, the node may be called a point. In the specification below, the node refers to an antenna group which is placed away by more than a certain interval from the DMNS. That is, it is assumed below that each node physically refers to RRH. However, the present invention is not limited to this example, and the node may be defined as an arbitrary antenna group regardless of the physical interval. For example, the base station, which is composed of a plurality of cross polarized antennas, may be formed of a node composed of horizontal polarized antennas and a node composed of vertical polarized antennas. The present invent may also be applied to the case when the cell coverage of each node is a small pico cell or a femto cell, i.e., the multi-cell system. In the description below, the antenna may be substituted by an antenna port, a virtual antenna, an antenna group, etc. as well as a physical antenna.

Figure 2:
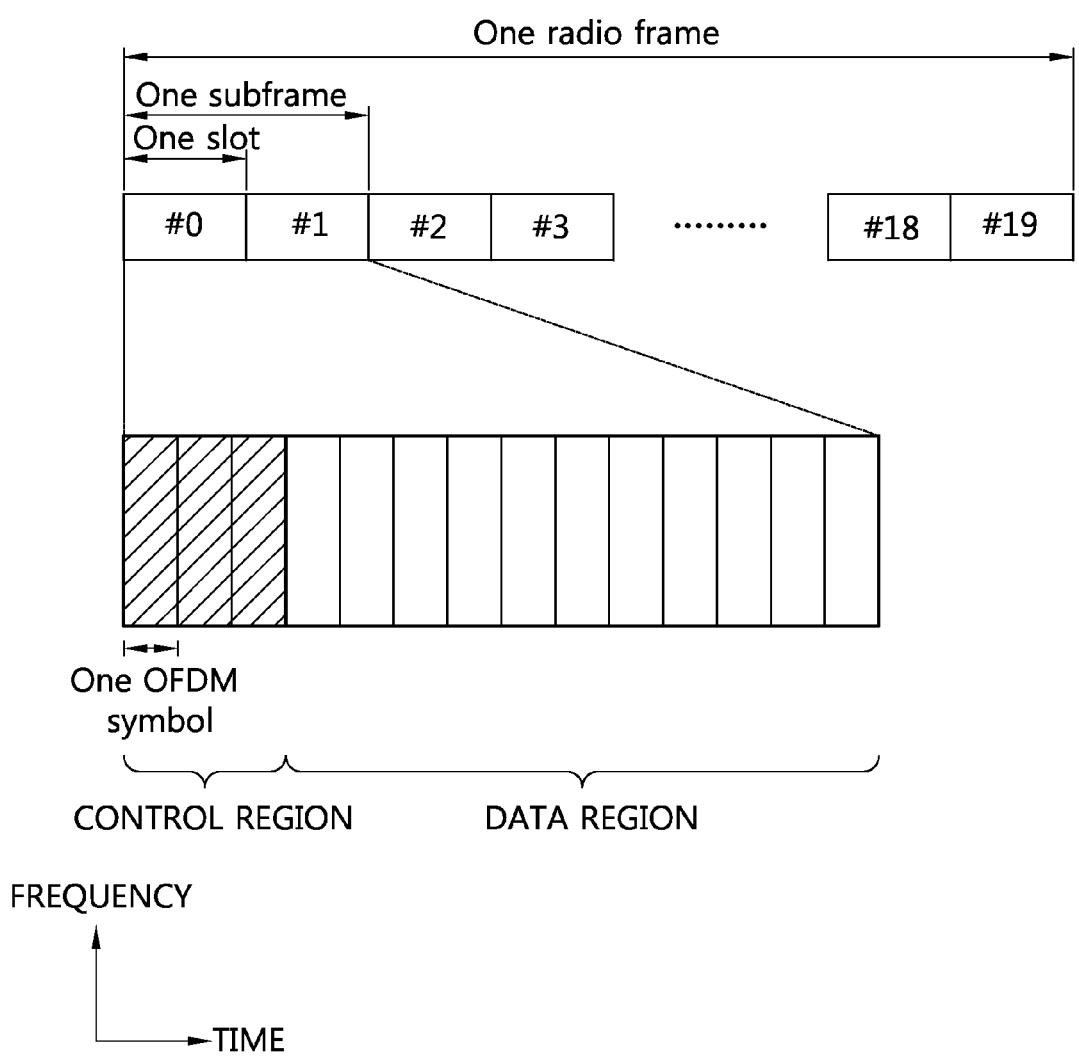
FIG. 2 shows a structure of a downlink wireless frame in a 3GPP LTE-A.

FIG. 2 shows a structure of a downlink wireless frame in a 3GPP LTE-A. For this, section 6 of 3GPP TS 36.211 V10.2.0 (2011-06) "Evolved Universal Terrestrial Radio Access (E-UTRA); Physical Channels and Modulation (Release 10)" may be referred to.

A radio frame includes 10 subframes having indexes 0 to 9. One subframe includes two consecutive slots. The time, which takes in transmission of one subframe, is called a transmission time interval (TTI). For example, the length of one subframe may be 1 ms, and the length of one slot may be 0.5 ms.

One slot may include a plurality of orthogonal frequency division multiplexing (OFDM) symbols. The OFDM symbol uses an orthogonal frequency division multiple access (OFDMA) in DL, and thus it is only to express one symbol period in the time domain and there is no limitation in the multiplexing scheme or name. For example, the OFDM symbol may be called as another name such as a single carrier-frequency division multiple access (SC-FDMA) or a symbol period.

It is illustrated that one slot includes 7 OFDM symbols, but the number of OFDM symbols included on slot may be changed depending on the length of the cyclic prefix (CP). According to 3GPP TS 36.211 V10.2.0, 1 slot in the normal CP includes 7 OFDM symbols, 1 slot in the extended CP includes 6 OFDM symbols.

The resource block (RB) is a resource allocation unit, and includes a plurality of subcarriers in one slot. For example, if one slot 7 OFDM symbols in the time domain and the RB includes 12 subcarriers in the frequency domain, one RB may include 7×12 resource elements (REs).

The DL subframe is divided into a control region and a data region in the time domain. The control region includes the maximum 4 OFDM symbols before the first slot within the subframe, but the number of OFDM symbols included in the control domain may be changed. The physical downlink control channel (PDCCH) and other control channels are allocated to the control region, and the DPSCH is allocated to the data region.

As disclosed in 3GPP TS 36.211 V10.2.0, in 3GPP LTE/LTE-A, the physical channel may be divided into physical downlink shared channel (PDSCH) and physical uplink shared channel (PUSCH) which are data channels, and physical downlink control channel (PDCCH), physical control format indicator channel (PCFICH), physical hybrid-ARQ indicator channel (PHICH), and physical uplink control channel (PUCCH) which are control channels.

The PCFICH, which is transmitted in the first OFDM symbol of the subframe, carries the control format indicator (CFI) about the number of OFDM symbols (i.e., the size of the control region) used in the transmission of control channels within the subframe. The UE first receives CFI on the PCFICH and monitors PDCCH. Unlike PDCCH, the PCFICH is transmitted through the fixed PCFICH resource of the subframe without using blind decoding.

The PHICH carries the positive-acknowledgement (ACK)/negative-acknowledgement(NACK) for hybrid automatic repeat request (HARQ). The ACK/NACK signal about the UL data on the PUSCH transmitted by the UE is transmitted on the PHICH.

The physical broadcast channel is transmitted in 4 OFDM symbols before the second slot of the first subframe of the wireless frame. The PBCH carries system information which is essential in communication between the UE and the base station, and the system information transmitted through the PBCH is called a master information block (MIB).

Furthermore, the system information, which is indicated by the PDCCH and is transmitted on the PDSCH, is called a system information block (SIB).

The control information transmitted through the PDCCH is called downlink control information (DCI). The DCI may include resource allocation of PDSCH (also called DL grant), resource allocation of PUSCH (also called UL grant), and activation voice over Internet protocol (VoIP) and/or a set of transmission power control commands for individual UEs within an arbitrary UE group.

The conventional DCI formats transmitted on the PDCCH will be described.

The DCI format includes the fields to be described below, and each field may be mapped with information bits $a_0 \sim a_{A-1}$. Each field may be mapped in the order explained in each DCI format, and each field may include "0" padding bits. The first field may be mapped to information bit $a_o$ of the lowest degree, and other consecutive fields may be mapped to information bits of higher degrees. The most significant bit (MSB) in each field may be mapped to the information bit of the lowest degree of the field. For example, the most significant bit of the first field may be mapped to $a_0$. Hereinafter, the set of fields included by each of the existing DCI formats is called the information field.

1. DCI format 0

The DCI format 0 is used for PUSCH scheduling. The information (field), which is transmitted through DCI format 0, is as follows.

1) The flag for distinguishing DCI format 0 from DCI format 1A (if 0, DCI format 0 is indicated, and if 1, DCI format 1A is indicated), 2) hopping flag (1 bit), 3) resource block designation and hopping resource allocation, 4) modulation and coding scheme redundancy version (5 bits), 5) new data indicator (1 bit), 6) TPC command (2 bits) for scheduled PUSCH, 7) cyclic shift (3 bits) for DM-RS, 8) UL index, 9) downlink designation index (TDD), and 10) CQI request. In DCI format 0, if the number of information bits is smaller than the payload size of DCI format 1A, "0" is padded so as to be the same as the payload size of DCI format 1A.

2. DCI format 1

DCI format 1 is used in one PDSCH codeword scheduling. The following information is transmitted to DCI format 1.

1) Resource allocation header (indicate resource allocation type 0/type 1)—When the downlink bandwidth is smaller than 10 PRB, the resource allocation header is not included and resource allocation type 0 is assumed. 2) Resource block designation, 3) modulation and coding scheme, 4) HARQ process number, 5) new data indicator, 6) redundancy version, 7) TPC command for PUCCH, 8) downlink designation index (only in TDD). When the number of information bits of DCI format 1 is the same as that of DCI format 0/1A, one bit having the value "0" is added to DCI format 1. In DCI format 1, if the number of information bits is the same as one of {12, 14, 16, 20, 24, 26, 32, 40, 44, 56}, the bit having one or more "0" values is added to DCI format 1 so as to have a payload size other than the payload size of the {12, 14, 16, 20, 24, 26, 32, 40, 44, 56} and the DCI format 0/1A.

Some examples of DCI format are 1A/1B/1C/1D, 2/2A/2B/2C, 3/3A, 4 as well as DCI formats 0 and 1, and such DCI formats are described in section 5.3.3 of 3GPP TS 36.212 V10.3.0 (2011-09).

The control region within the subframe includes a plurality of control channel elements (CCEs). The CCE is a logical allocation unit which is used to provide the encoding rate to the PDCCH, and corresponds to a plurality of resource element groups (REGs). The REG includes a plurality of resource elements. The PDCCH format and the possible PDCCH bit number are determined according to the correlation between the number of CCEs and the encoding rate provided by the CCEs.

One REG includes 4 REs, and one CCE includes 9 REGs. {1, 2, 4, 8} CCEs may be used to form one PDCCH, and each of {1, 2, 4, 8} is called CCE aggregation level.

The number of CCEs used in the PDDCH transmission is determined by the base station according to the channel state. For example, one CCE may be used in PDCCH transmission to the UE having a good downlink channel state. 8 CCEs may be used in PDCCH transmission to the UE having a poor downlink channel state.

In the 3GPP LTE, blind decoding is used for detection of PDCCH. The blind decoding is a scheme of demasking the desired identifier to the cyclic redundancy check (CRC) of the received PDCCH (called a candidate PDCCH) and checking the CRC error and checking whether the PDCCH is its own control channel.

In 3GPP LTE, a search space is used to reduce the burden of the UE due to blind decoding. The search space may be called a monitoring set of CCE for PDCCH. The UE monitors PDCCH within the corresponding search space.

The search space is divided into a common search space and a UE-specific search space. The common search space is a space for searching for PDCCH including common control information, and is composed of 16 CCEs of CCE indexes 0 to 15 and supports PDCCH having CCE integration level of {4, 8}. However, PDCCH (DCI format 0, 1A), which carries UE-specific information, may also be transmitted to the common search space. The UE-specific search space supports PDCCH having CCE aggregation level of {1, 2, 4, 8}.

The base station determines the PDCCH format according to the DCI which is to be sent to the UE, then attaches CRC on DCI, and masks a identifier (called a radio network temporary identifier (RNTI)), which is unique according to the owner or usage of the PDCCH, to the CRC.

Figure 3:
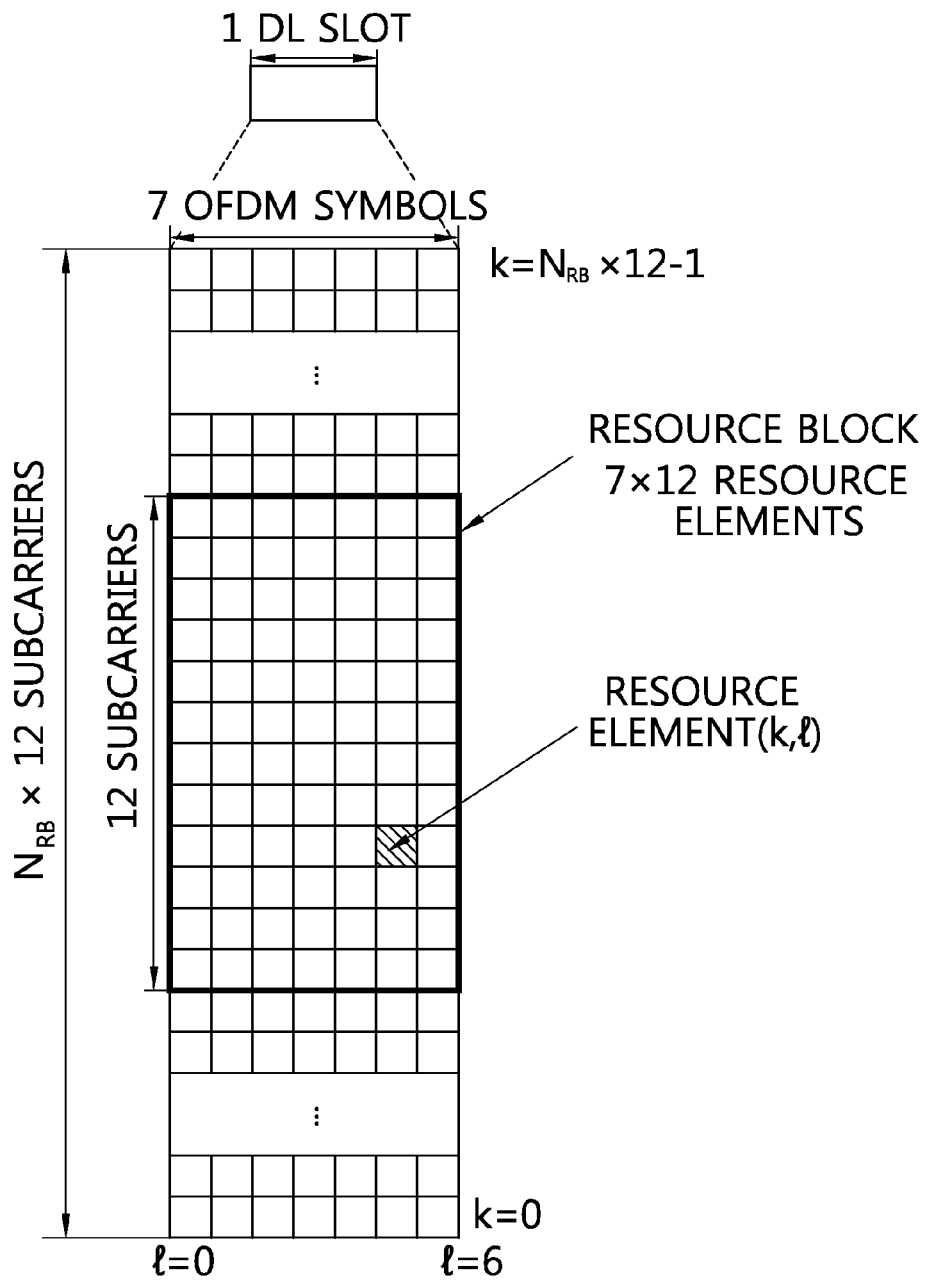
FIG. 3 shows an example of a resource grid for one downlink slot.

FIG. 3 shows an example of a resource grid for one downlink slot.

The downlink slot includes a plurality of OFDM symbols in the time domain, and includes $N_{RB}$ resource blocks in the frequency domain. $N_{RB}$, which is the number of resource blocks included in the downlink slot, is dependent on the downlink transmission bandwidth which is set in the cell. For example, in the LTE system, the $N_{RB}$ may be one of 6 to 110. One resource block includes a plurality of subcarriers in the frequency domain. The structure of the uplink slot may be the same as the structure of the downlink slot.

Each element on the resource grid is called a resource element (RE). The resource element on the resource grid may be identified by the index pair (k, l) within the slot. Here, k (k=0, . . . , $N_{RB}$×12−1) is the subcarrier index within the frequency domain, and l (l=0, . . . , 6) is the OFDM symbol index within the time domain.

Here, it is illustrated that one resource block includes 7 OFDM symbols in the time domain and includes 7×12 resource elements composed of 12 subcarriers in the frequency domain, but the number of OFDM symbols and subcarriers in the resource block is not limited thereto. The number of OFDM symbols and the number of subcarriers may be changed depending on the length of the CP and the frequency spacing, etc. For example, in the case of the normal CP, the number of OFDM symbols is 7, and in the case of the extended CP, the number of OFDM symbols is 6. In one OFDM symbol, the one of 128, 256, 512, 1024, 1536 and 2048 may be selected and used as the number of subcarriers.

Figure 4:
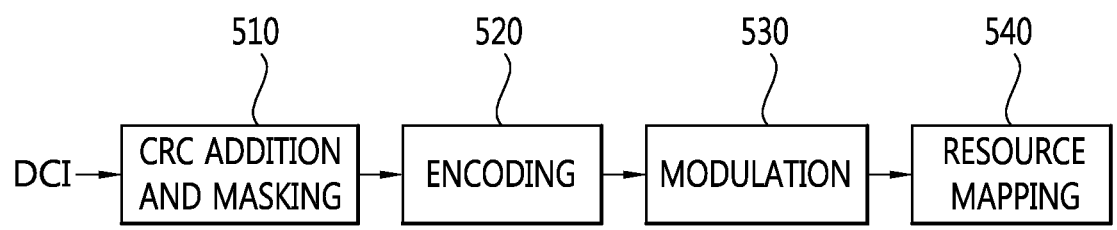
FIG. 4 a block diagram illustrating the configuration of PDCCH.

FIG. 4 is a block diagram illustrating the structure of PDCCH.

The base station determines the PDCCH format according to the DCI which is to be sent to the UE, then attaches CRC on DCI, and masks a identifier (called a radio network temporary identifier (RNTI)), which is unique according to the owner or usage of the PDCCH, with the CRC (510).

In the case of the PDCCH for a specific UE, the UE's unique identifier, for example, the C-RNTI (cell-RNTI) may be masked with CRC. Furthermore, in the case of the PDCCH for paging message, the paging indication identifier, for example, the paging-RNTI (P-RNTI) may be masked with CRC. In the case of PDCCH for system information, the system information identifier, for example, the system information-RNTI (SI-RNTI) may be masked with CRC. In order to indicate a random access response, which is a response to the transmission of the random access preamble, random access-RNTI (RA-RNTI) may be masked with CRC.

If C-RNTI is used, PDCCH carries control information for the specific UE (called UE-specific control information), and if another RNTI is used, the PDCCH carries common control information which is received by all or a plurality of UEs within the cell.

The coded data is generated by encoding DCI to which CRC has been added (520). The encoding includes channel encoding and rate matching.

The coded data is modulated so as to generate modulation symbols (530). Quadrature phase shift key (QPSK) is used as a modulation scheme.

The modulation symbols are mapped with the physical resource element (RE) (540). Each of the modulation symbols is mapped with the RE.

Furthermore, various reference signals (RSs) are also transmitted to the subframe. The cell-specific reference signal (CRS) may be received by all UEs within the cell, and is transmitted throughout the entire downlink band. The CRS may be generated based on cell ID. Furthermore, the UE-specific reference signal (URS) may be transmitted to the subframe. The CRS is transmitted in the entire region of the subframe, but the URS is transmitted within the data region of the subframe and is used in the demodulation of the corresponding PDSCH. The URs is also called demodulation RS (DM-RS). The URS will be described below.

In addition to antenna port 5, the URS sequence $r_{ns}(m)$ is defined as follows.

$$r_{n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 12N_{RB}^{PDSCH} - 1$$

Equation 1

In Equation 1, $N^{PDSCH}_{RB}$ shows the frequency band of the corresponding PDSCH transmission in resource block units.

The pseudo-random sequence c(i) is defined by the gold sequence of the following length 31.

$$c(n)=(x_1(n+Nc)+x_2(n+Nc))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \qquad \text{Equation 2}$$

The pseudo-random sequence is initialized to $c_{init}=(\lfloor n_s/2\rfloor+1)\cdot(2N_{ID}^{cell}+1)\cdot2^{16}+n_{RNTI}$ in the start of each subframe. Here, $n_{RNTI}$ refers to the radio network temporary identifier.

Furthermore, when antenna port p is {7, 8, . . . , v+6}, URS sequence r(m) may be defined as follows.

$$r(m) = \frac{1}{\sqrt{2}}(1-2\cdot c(2m)) + j\frac{1}{\sqrt{2}}(1-2\cdot c(2m+1)), \quad \text{Equation 3}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

The pseudo-random sequence is initialized to $c_{init}=(\lfloor n_s/2\rfloor+1)\cdot(2N_{ID}^{cell}+1)\cdot2^{16}+n_{SCID}$ at the start of each subframe. The $n_{SCID}$ is given in the most recent DCI format 2B or 2C associated with the PDSCH transmission for antenna ports 7 and 8 according to the following table.

TABLE 1

| Scrambling identity field in DCI format 2B or 2C | $n_{SCID}$ |
|---|---|
| 0 | 0 |
| 1 | 1 |

If there is not DCI format 2B or 2C associated with PDSCH transmission of antenna port 7 or 8, it is assumed that, in the UE, $n_{SCID}$ is 0.

With respect to antenna ports 9 to 14, it is assumed that, in the UE, $n_{SCID}$ is 0.

The URS is supported for PDSCH transmission, and is transmitted in p=5, p=7, p=8 or p=7,8, . . . , v+6. Here, "v" refers to the number of layers used in PDSCH transmission.

The URSs may be transmitted to one UE through antenna ports included in set S. It may be that S={7,8,11,13} or S={9,10,12, 14}.

With respect to antenna ports p=7, p=8, p=7, 8, . . . , v+6, the physical resource block having the frequency domain index $n_{PRB}$ is allocated for PDSCH transmission. Part of the URS sequence r(m) is mapped with complex value modulation symbol $a^{(p)}_{k,l}$ as follows.

$$a^{(p)}_{k,l} = w_p(l')\cdot r(3\cdot l'\cdot N_{RB}^{max,DL} + 3\cdot n_{PRB} + m') \quad \text{Equation 4}$$

where $$w_p(i) = \begin{cases} \bar{w}_p(i) & (m'+n_{PRB})\mod 2 = 0 \\ \bar{w}_p(3-i) & (m'+n_{PRB})\mod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\mod 2 + 2 & \text{if in a special subframe with configuration 3, 4, or 8 (see Table 4.2-1)} \\ l'\mod 2 + 2 + 3\lfloor l'/2\rfloor & \text{if in a special subframe with configuration 1, 2, 6, or 7 (see Table 4.2-1)} \\ l'\mod 2 + 5 & \text{if not in a special subframe} \end{cases}$$

$$l' = \begin{cases} 0, 1, 2, 3 & \text{if } n_s\mod 2 = 0 \text{ and in a special subframe with configuration 1, 2, 6, or 7 (see Table 4.2-1)} \\ 0, 1 & \text{if } n_s\mod 2 = 0 \text{ and not in special subframe with configuration 1, 2, 6, or 7 (see Table 4.2-1)} \\ 2, 3 & \text{if } n_s\mod 2 = 1 \text{ and not in special subframe with configuration 1, 2, 6, or 7 (see Table 4.2-1)} \end{cases}$$

$$m' = 0, 1, 2$$

Sequence $\bar{w}_p(i)$ is given in the normal CP as shown in the following table.

TABLE 2

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

That is, the configuration of the URS is determined by cell ID, scrambling ID, antenna port, etc.

Figure 5:
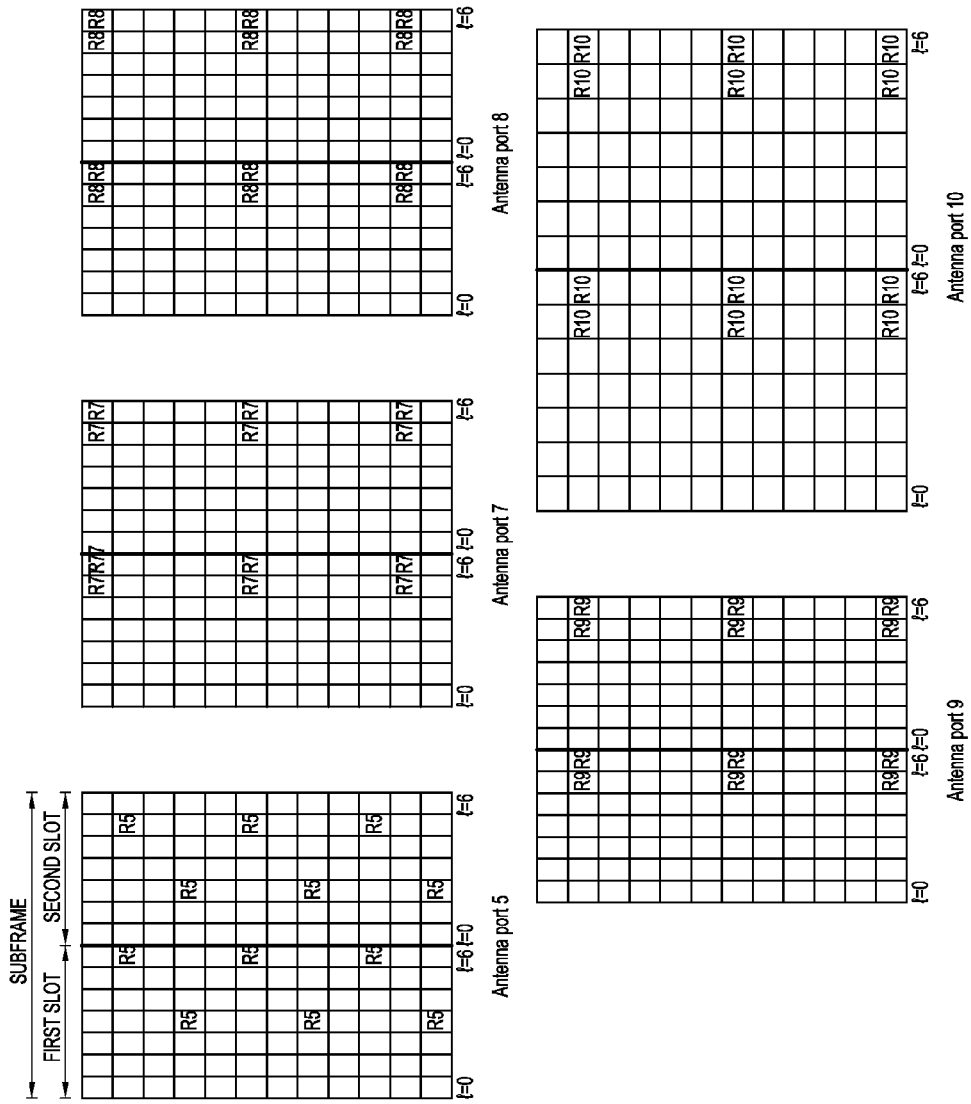
FIG. 5 shows an example of RB to which URS is mapped and shows DM-RS as an example of the URS.

FIG. 5 shows an example of RB to which URS is mapped and shows DM-RS as an example of the URS.

FIG. 5 shows resource elements used for DM-RS in the normal CP structure. Rp denotes a resource element used in DM-RS transmission on antenna port P. For example, R5 indicates a resource element transmitted by DM-RS for antenna port 5. Furthermore, referring to FIG. 4, DM-RS for antenna ports 7 and 8 is transmitted through resource elements corresponding to first, sixth and eleventh subcarriers (subcarrier indexes 0, 5, and 10) of sixth and seventh OFDM symbols (OFDM symbol indexes 5 and 6) of each slot. The DM-RS for antenna ports 7 and 8 may be distinguished by the orthogonal sequence of length 2. The DM-RS for antenna ports 9 and 10 is transmitted through resource elements corresponding to second, seventh and twelfth subcarriers (subcarrier indexes 1, 6, and 11) of sixth and seventh OFDM symbols (OFDM symbol indexes 5 and 6) of each slot. The DM-RS for antenna ports 9 and 10 may be distinguished by the orthogonal sequence of length 2. Furthermore, S={7,8,11,13} or S={9,10,12,14}, and thus DM- RS for antenna ports 11 and 13 is mapped to the resource element where DM-RS for antenna ports 7 and 8 is mapped, and the DM-RS for antenna ports 12 and 14 is mapped to the resource element where the DM-RS for antenna ports 9 and 10 is mapped.

Furthermore, in 3GPP Rel-11 or higher system, the multi-node system including a plurality of connection nodes for When the URS is used, antenna port 7 and scrambling ID=0 is used. On the other hand, when using the CRS, antenna port 0 is used only when the number of the PBCH transmission antennas is 1, and all of antenna ports {0 to 1} and {0 to 3} may be used by converting to the transmission diversity mode when the number of PBCH transmission antennas is 2 or 4.

TABLE 3

| Transmission mode | DCI format | Transmission scheme of PDSCH corresponding to R-PDCCH |
| --- | --- | --- |
| Mode 8 | DCI format 1A | When R-PDCCH is demodulated based on URS: Single antenna port: antenna port 7 and $n_{SCID} = 0$ is used. When R-PDCCH is demodulated based on CRS: If the number of PBCH antenna ports is 1, a single antenna port, i.e., antenna port 0, is used. Otherwise, the transmission diversity is used. |
|  | DCI format 2B | Dual layer transmission by antenna ports 7 and 8; Or signal antenna port by antenna port 7 or 8 |
| Mode 9 | DCI format 1A | When R-PDCCH is demodulated based on URS: Single antenna port: antenna port 7 and $n_{SCID} = 0$ is used. When R-PDCCH is demodulated based on CRS: If the number of PBCH antenna ports is 1, a single antenna port, i.e., antenna port 0, is used. Otherwise, the transmission diversity is used. |
|  | DCI format 2C | Up to 4 layer transmissions are used: antenna ports 7 to 10 | performance improvement like FIG. 1 is introduced. Furthermore, the standardization work for applying various MIMO schemes and cooperative communication schemes which are under development and can be applied in the future is under progress.

Due to the node introduction, an introduction of a new control channel for applying various cooperative communication schemes to a multi-node environment is being requested. The control channel, about which a new introduction is being discussed, is enhanced-PDCCH (E-PDCCH).

Figure 6:
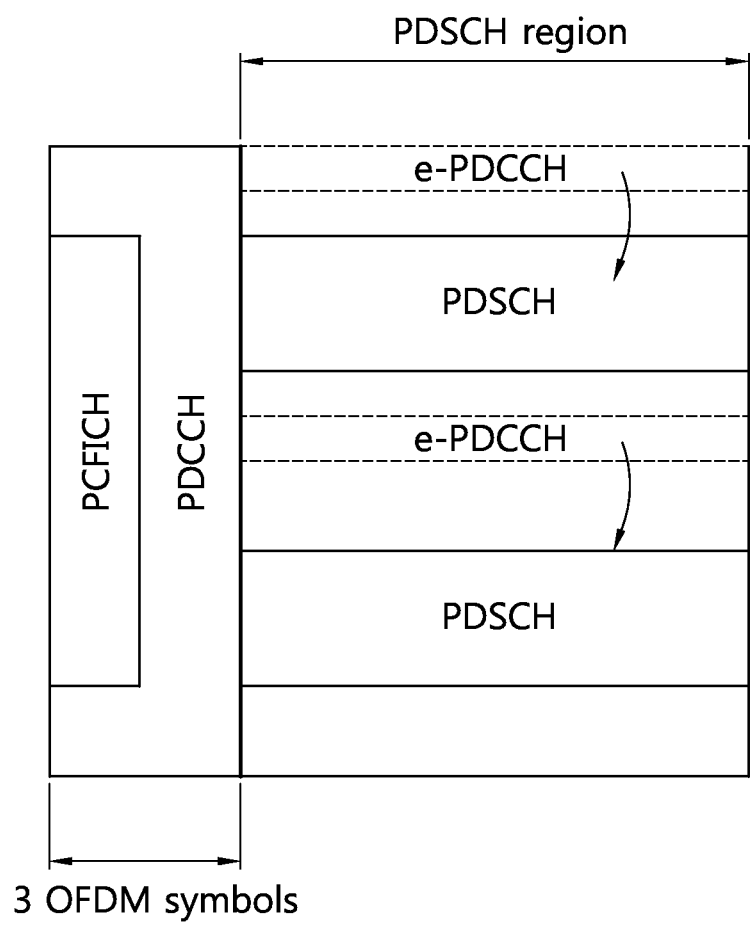
FIG. 6 shows an example of E-PDCCH.

FIG. 6 shows an example of E-PDCCH.

The allocation location of the E-PDCCH may be within the data region (PDSCH region) other than the existing control region (PDCCH region). The control information for the node may be transmitted for each UE through the E-PDCCH, and thus the lacking problem of the existing PDCCH region may be resolved.

The E-PDCCH is not provided to UEs which are operated by the existing 3GPP rel 8-10, and may be searched by the UE which operates in Rel 11 or higher version. Further, part of the PDSCH region is allocated so as to be used. For example, the E-PDCCH may define part of the PDSCH which generally transmits data as in FIG. 6 so as to be used. The UE may perform blind decoding in order to detect the UE's own E-PDCCH. The E-PDCCH may perform the same scheduling operation as that of the existing PDCCH, i.e., the PDSCH or PUSCH scheduling operation.

The structure of the existing R-PDCCH structure may be reused in a specific allocation scheme of the E-PDCCH. This is to minimize the impact which occurs when the already standardized standard is changed.

Figure 7:
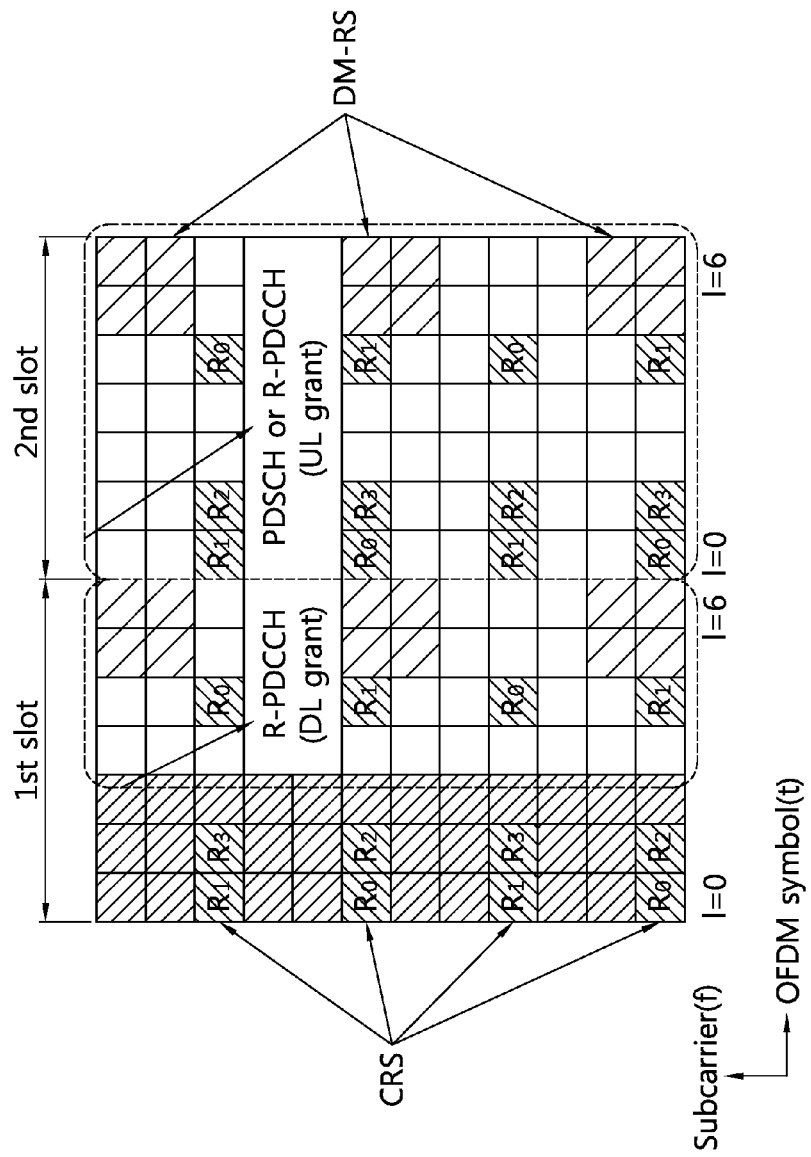
FIG. 7 shows an example of an existing R-PDCCH.

FIG. 7 shows an example of the existing R-PDCCH.

In the frequency division duplex (FDD) system, only the DL grant is allocated in the first slot of the resource block, and the UL grant or data (PDSCH) may be allocated in the second slot. At this time, R-PDCCH is allocated to the data RE except all of the PDCCH, CRS, and URS. All of URS and CRS may be used in the R-PDCCH modulation.

<Operation method of E-PDCCH>

Figure 8:
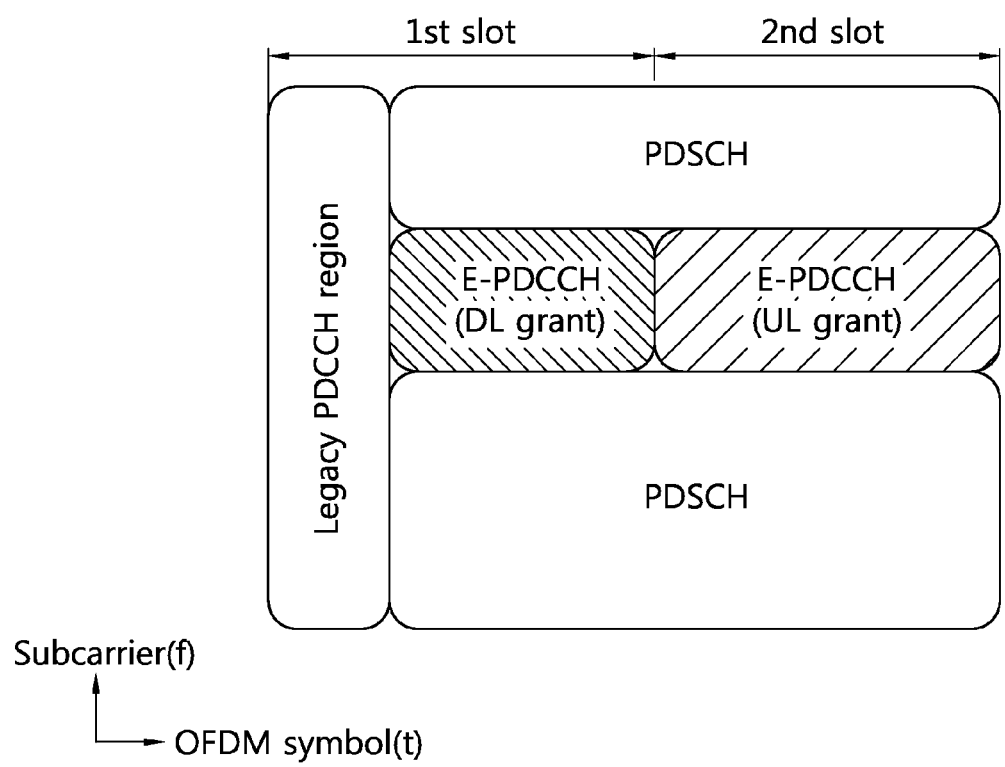
FIG. 8 shows an example of separating and allocating a DL grant and a UL grant for each slot.

FIG. 8 shows an example of separating and allocating a DL grant and a UL grant for each slot. The case where the E-PDCCH is formed at both the first slot and the second slot within the subframe is assumed.

Referring to FIG. 8, the DL grant is allocated to the first slot of the subframe, and the UL grant is allocated to the second slot.

The DL grant means DCI formats for transmitting downlink control information of the UE, for example, DCI formats 1, 1A, 1B, 1C, 1D, 2, and 2A. The UL grant means DCI formats including control information associated with the uplink transmission of the UE, for example, DCI formats 0 and 4.

The UE is divided into a DL grant and a UL grant which need to be searched for each slot within the subframe. Hence, blind decoding for finding the DL grant is performed by forming a search space within the first slot, and blind decoding for finding the UL grant is performed in the search space formed in the second slot.

In the LTE, there are modes 1 to 9 in the downlink transmission mode, and there are modes 1 to 2 in the uplink transmission mode. Each transmission is set for each UE through the upper layer signaling. In the downlink transmission mode, there are two DCI formats which need to be found by each UE for each set mode. On the other hand, in the uplink transmission mode, the number of DCI formats, which need to be found by each UE, is 1 or 2. For example, in the uplink transmission mode 1, the DCI format 0 corresponds to UL grant, and in the uplink transmission mode 2, the DCI formats 0 and 4 correspond to the UL grant.

In the case of FIG. 8, the number of times of blind decoding, which needs to be performed to detect the UE's E-PDCCH in the search space formed for each slot, is as follows.

DL grant: (number of PDCCH candidates)×(number of DCI formats for downlink transmission mode)=16×2=32.

UL grant: (number of PDCCH candidates in uplink transmission mode 1)×(number of DCI formats in uplink transmission mode 1)=16×1=16 or (number of PDCCH candidates in uplink transmission mode 2)×(number of DCI formats in uplink transmission mode 2)=16×2=32.

Hence, the total number of times of blind decoding, which is generated by combining the number of times of blind decoding in the first slot and the number of times of blind decoding in the second slot, is 32+16=48 in the uplink transmission mode 1, and 32+32=64 in the uplink transmission mode 2.

Figure 9:
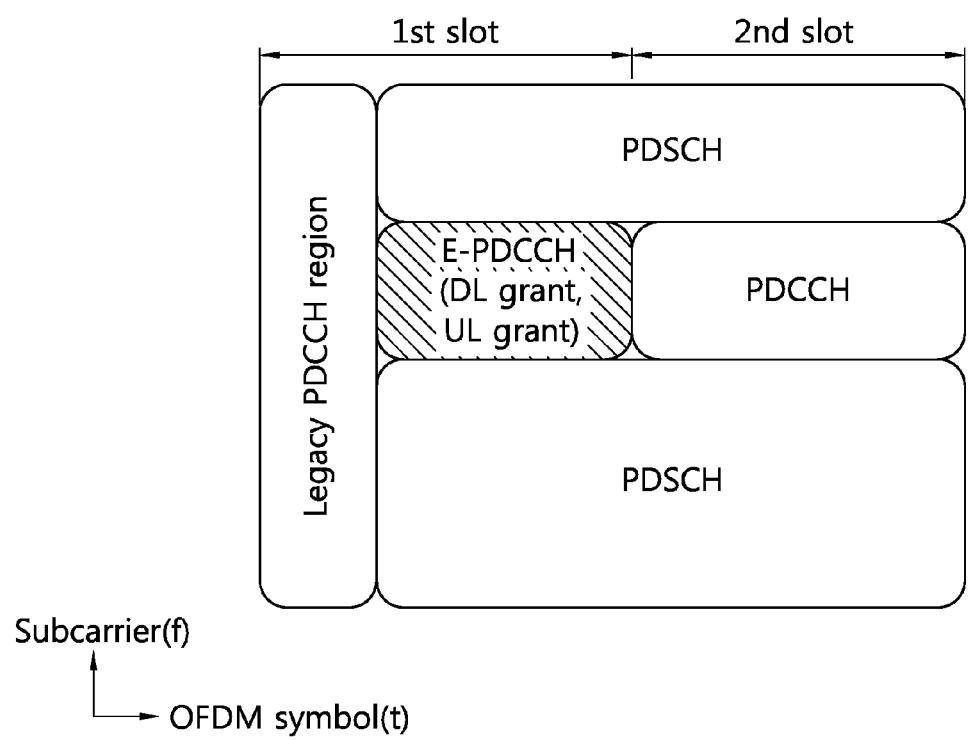
FIG. 9 shows an example of simultaneously allocating a DL grant and a UL grant for a first slot.

FIG. 9 shows an example of simultaneously allocating a DL grant and a UL grant for a first slot. The case where the E-PDCCH is formed only in the first slot of the subframe is assumed.

Referring to FIG. 9, when allocating the E-PDCCH, the DL grant and the UL grant may be simultaneously allocated to the first slot of the subframe. Hence, the DL grant and the UL grant simultaneously exist in the E-PDCCH of the first slot. The UE performs blind decoding for detecting the DL grant and the UL grant only in the first slot.

In the LTE, DCI formats, which need to detected, are determined according to the transmission mode which is set for each UE. In particular, a total of 2 DCI formats may be detected for each downlink transmission mode, and DCI format 1A is basically included in all downlink transmission modes in order to support the fall-back mode.

In the UL grant, the DCI format 0 has the same length as that of the DCI format 1A, and may be distinguished through a 1 bit flag. Hence, the additional blind decoding is not performed. However, DCI format 4, which is the remaining one among the UL grants, needs to perform the additional blind decoding.

In the case of FIG. 9, the number of times of blind decoding, which needs to be performed to search for the UE's E-PDCCH in the search space, is as follows.

DL grant: (number of PDCCH candidates)×(number of DCI formats for downlink transmission mode)=16×2=32.

UL grant: (number of PDCCH candidates in uplink transmission mode 1)×(number of DCI formats in uplink transmission mode 1)=0 or (number of PDCCH candidates in uplink transmission mode 2)×(number of DCI formats in uplink transmission mode 2)=16×1=16.

Hence, the total number of times of blind decoding is 32+0=32 in the uplink transmission mode 1, and 32+16=48 in the uplink transmission mode 2.

<Resource efficiency of E-PDCCH>

The existing PDCCH transmits a control signal within the limited resources, that is, initial 1, 2, or 3 OFDM symbols within the subframe (the maximum 4 OFDMs may be possible depending on the allocated frequency band). At this time, the control signal is transmitted through the common search space (CSS) and US-specific search space (USS). However, the E-PDCCH assumes the resource allocation in the resource block unit. Hence, the E-PDCCH may transmit the control signal through much more resources compared to the existing PDCCH, and a greater coding gain may be obtained.

A distributed allocation or local allocation scheme may be applied as the resource allocation scheme of the E-PDCCH depending on the UE mobility or Doppler distribution characteristic. That is, when the UE has a high mobility or high Doppler distribution characteristics, the distributed allocation scheme may be used, and when the UE has a low mobility or low Doppler distribution characteristics, the local allocation scheme may be used.

In the case of REL 11 or more UEs having a low mobility or low Doppler distribution characteristics, when a control signal is received through the E-PDCCH, the UE applies the same beam as the PDSCH region to the E-PDCCH so as to obtain an additional beam forming gain.

Likewise, when considering the control signal transmission scheme as in the existing PDCCH, the E-PDCCH may operate in an unnecessarily high SINR region because the E-PDCCH may have an increased coding gain and beamforming gain in a certain situation. This may not be appropriate in terms of resource efficiency.

Furthermore, according to the multiplexing experiment result about the E-PDCCH, when the DCI format 1A is transmitted through the E-PDCCH, the control signal is mostly transmitted in aggregation level 1 in the UEs which operate in multi-user MIMO (MU-MIMO) as well as in UEs which operate in single user-multi input multi output (SU-MIMO).

Hereinafter, the present invention will be described.

Embodiment 1

The E-PDCCH is a resource allocation unit, and a resource allocation unit other than the CCE of the existing PDCCH may be used. For example, a resource allocation unit, which is greater than the existing CCE, like the resource block may be used, or a new resource allocation unit, which is smaller than the CCE, may be used. Hereinafter, an example that the resource block is used as the resource allocation unit of the E-PDCCH is used, but the embodiment is not limited thereto. When the resource block is used as the resource allocation unit, the aggregation indicates the number of resource blocks, not the number of CCEs to form the E-PDCCH.

When the resource allocation unit of the E-PDCCH is the resource block, there is a larger amount of resources than that of the existing PDCCH (particularly when the resource is allocated in a localized scheme), and the control signal may be transmitted in a high SINR region due to the coding gain, beamforming gain, etc. In the wireless communication, it is preferable to enhance the system performance by dynamically changing the modulation scheme and coding scheme according to the channel state. For example, the signal may be transmitted to the UE with a good channel state by applying a high coding rate and a high modulation degree, and the signal may be transmitted to the UE with a poor channel state by applying a low coding rate and a low modulation degree. Hence, using only the QPSK as the modulation scheme to the UE, which receives the control signal through the E-PDCCH which may be transmitted in a high SINR region, as in the existing PDCCH, is low in efficiency. The QPKS is a modulation scheme indicating 2 bits by 4 constellation points by giving the phase change ($\Pi/2$).

Furthermore, according to an experiment, the wireless resources allocated to the UE when transmitting the E-PDCCH mostly have aggregation level 1 or 2. Based on this experiment result, a modulation level (modulation degree) higher than that of the existing QPSK, for example, 16 quadrature amplitude modulation (16QAM) may be used for a specific aggregation level of the E-PDCCH. The 16QAM is a modulation scheme where 4 bits are indicted with a total of 16 constellation points by having 2 amplitudes for 4 phases among the 12 phases and 12 phases having the phase change.

For example, when transmitting the E-PDCCH, the base station may use 16QAM as the modulation scheme when the aggregation level of the E-PDCCH is 1 or {1, 2}. Furthermore, in the case of the E-PDCCH having the remaining aggregation level, QPSK may be used as the modulation scheme.

Figure 10:
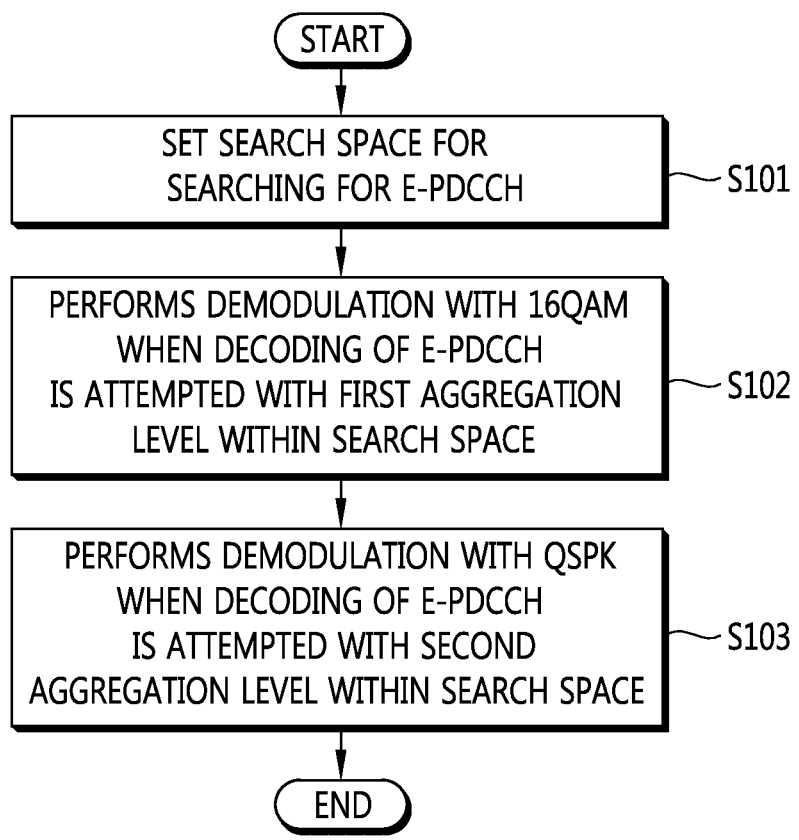
FIG. 10 shows a method of decoding E-PDCCH according to a first embodiment of the present invention.

FIG. 10 shows a method of decoding E-PDCCH according to a first embodiment of the present invention.

The UE sets a search space for searching for the E-PDCCH (S101).

Information for the search space setting may be received from the base station.

When the decoding of the E-PDCCH is attempted with the first aggregation level within the search space, the UE performs demodulation with 16QAM (S102). The first aggregation level may be aggregation level 1 or aggregation level {1, 2}.

When the decoding of the E-PDCCH is attempted with the second aggregation level within the search space, the UE performs demodulation with QPSK (S103). The second aggregation level may be aggregation level 4 or 8.

From the perspective of the base station, 16QAM is used for modulation in aggregation level 1 or 2 at the time of transmission of E-PDCCH, and QPSK is used for the remaining aggregation level.

According to the first embodiment, when the decoding of the E-PDCCH is attempted with the first aggregation level (aggregation level 1 or 2), the UE performs decoding with 16QAM, and when the decoding of the E-PDCCH is attempted with the second aggregation level (remaining aggregation level), the UE performs decoding with QPSK. In the present invention, the number of times of decoding of the UE is the same as the number of times of existing blind decoding, but a higher modulation degree may be used compared to PDCCH, and thus the resource efficiency is improved. That is, the recourses may be more efficiently used without an increase in the number of times of blind decoding for the E-PDCCH.

Embodiment 2

The base station may apply a modulation degree which is determined for each DCI format which is transmitted through E-PDCCH.

The table below shows the bit length of the DCI format which is transmitted in a base station having two transmission antennas where the system band is 10 MHz. However, it is assumed that the carrier indicator (3 bits) is exempted and FDD is used.

TABLE 4

| DCI format | 0/1A/ 3/3A | 1 | 1B | 1C | 1D | 2 | 2A | 2B | 2C | 4 |
|---|---|---|---|---|---|---|---|---|---|---|
| Payload size (Bit) | 27 | 31 | 28 | 13 | 28 | 43 | 41 | 41 | 42 | 35 |
| Total size (including CRC) | 43 | 47 | 44 | 29 | 44 | 59 | 57 | 57 | 58 | 51 |

In the case of the existing PDCCH, the resource allocation unit is CCE. Hence, for each DCI format, 36 RE (=72 bits)*aggregation level=72*{1, 2, 4, 8}={72, 144, 288, 576} bits are modulated with QPSK so as to be transmitted.

In the case of DCI format 1A, a total of 43 bits are transmitted by adding 16 bit CRC to 27 information bits. At this time, the effective coding rate becomes {0.5972, 0.2986, 0.1493, 0.07465} for each aggregation level. When the information bits are I and the length of the encoded code is N, the effective coding rate is I/N.

The E-PDCCH may be allocated in slot units (resource block unit). In this case, aggregation level 1 may refer to 1 resource block (first slot), aggregation level 2 refers to one resource block pair (first slot, second slot), aggregation level 4 may refer to 2 resource block pairs (first slot, second slot), and aggregation level 9 may refer to 4 resource block pairs (first slot, second slot).

2 OFDM symbols for the existing PDCCH including 2 Tx CRS may be exempted from the resource blocks allocated to the E-PDCCH. Furthermore, reference signal symbols for MBSFN subframe or 2 port DMRS (CSI-RS overhead) may be exempted.

When the above-described allocation scheme is considered, in the case of the E-PDCCH, {54, 132, 264, 528} RE={108, 264, 528, 1056} bits may be modulated by QPSK so as to be transmitted. When the DCI format 1A (43 bitS) is transmitted, the effective coding rate becomes {0.398, 0.163, 0.081, 0.041} for each aggregation level. When the DCI format 2C (58 bits) is transmitted, the effective coding rate becomes {0.537, 0.2197, 0.1098, 0.0549} for each aggregation level.

In 3GPP REL 11 or higher system, the modulation degree for each DCI format of the E-PDCCH may be defined in a manner that fits the target effective coding rate of the E-PDCCH based on the effective coding rate for the payload size of the DCI format of the existing DPCCH.

In particular, in the case of DCI formats having a relatively small payload size like existing DCI format 0/1A/3/3A, the SINR margin in the E-PDCCH gets larger. Hence, a modulation degree, which is higher than the existing PDCCH, may need to be applied.

When the existing DCI format is transmitted to the E-PDCCH in comparison with the existing PDCCH, a modulation into a higher modulation degree is possible for a specific DCI format. Hence, strong and resource-efficient transmission is possible without an overhead increase of blind decoding in the UE in comparison with the case which is transmitted through the existing PDCCH.

For example, the base station may modulate the existing DCI format 0/1/1A/1B/1C/1D/3/3A, from among the DCI formats transmitted to the E-PDCCH, or the DCI format whose length is less than that, with 16QAM, and may modulate 2/2A/2B/2C/4 with QPSK.

Furthermore, the DCI format, whose payload size is equal to or smaller than the payload size of the existing DCI format 0/1A/3/3A, from among the DCI formats transmitted to the E-PDCCH, may be modulated with 16QAM and the DCI format, whose payload size is greater than the payload size of the existing DCI format 0/1A/3/3A, from among the DCI formats transmitted to the E-PDCCH, may be modulated with QPSK.

Applying the modulation degree, which is different from the existing PDCCH, to the existing DCI formats may be performed for all E-PDCCH, and may be limited to the USS to which the local allocation is applied. The UE may perform demodulation by applying a modulation degree which is different from the region of the existing DPCCH or another E-PDCCH for the same DCI format in a specific E-PDCCH region.

Figure 11:
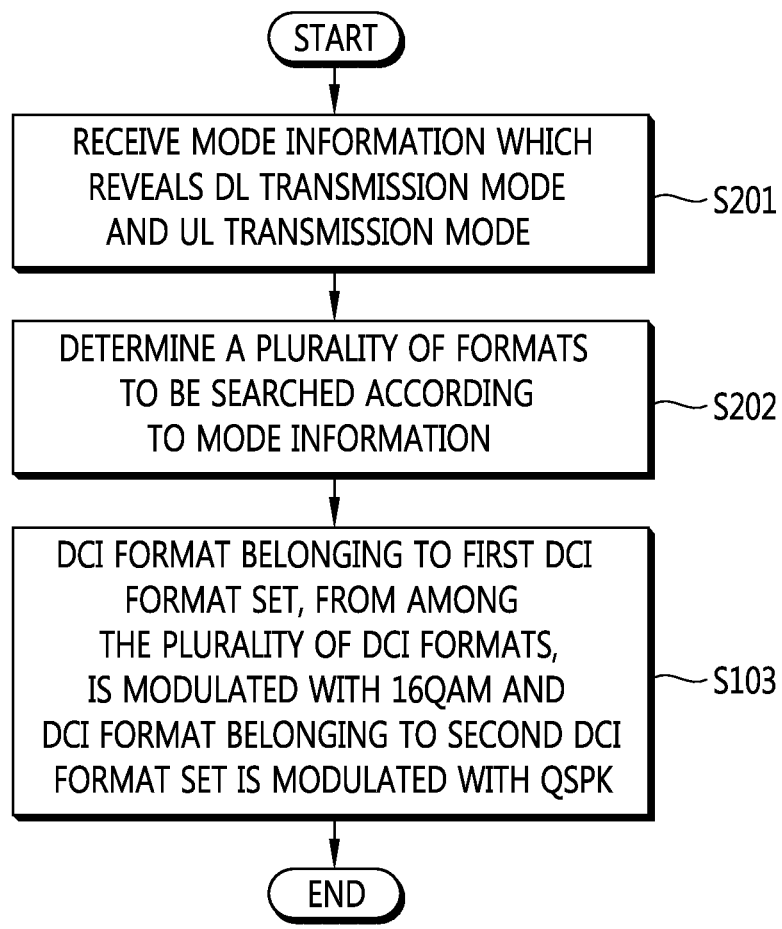
FIG. 11 shows a method of decoding E-PDCCH according to a second embodiment of the present invention.

FIG. 11 shows a method of decoding E-PDCCH according to a second embodiment of the present invention.

The UE receives mode information which reveals downlink transmission mode and uplink transmission mode (S201). The mode information may be received through the RRC message.

The UE determines a plurality of DCI formats which need to be searched according to mode information (S202), and the DCI format, which belongs to the first DCI format set, from among the plurality of DCI formats, is demodulated with 16QAM, and the DCI format, which belongs to the second DCI format set, is demodulated with QPSK (S203).

Embodiment 3

The base station uses the modulation degree greater than the QPSK in the E-PDCCH modulation, and the UE may first apply a specific modulation degree at the time of blind decoding.

The base station modulates the DCI format, which is transmitted through E-PDCCH, using QPSK and 16QAM, and the UE performs first blind decoding for 16QAM. The UE may understand DCI formats to be searched by mode information. However, the scheme in which the DCI formats have been modulated cannot be known. In such a situation, the UE may first apply a specific modulation scheme. For example, DCI formats are demodulated with 16QAM and are then modulated with QPSK.

Furthermore, the base station applies QPSK and 16QAM for DCI formats which are transmitted through E-PDCCH, and the UE may first perform blind decoding for aggregation levels 1 and 2 with 16QAM and may perform blind decoding for aggregation levels 4 and 8 with QPSK.

Figure 12:
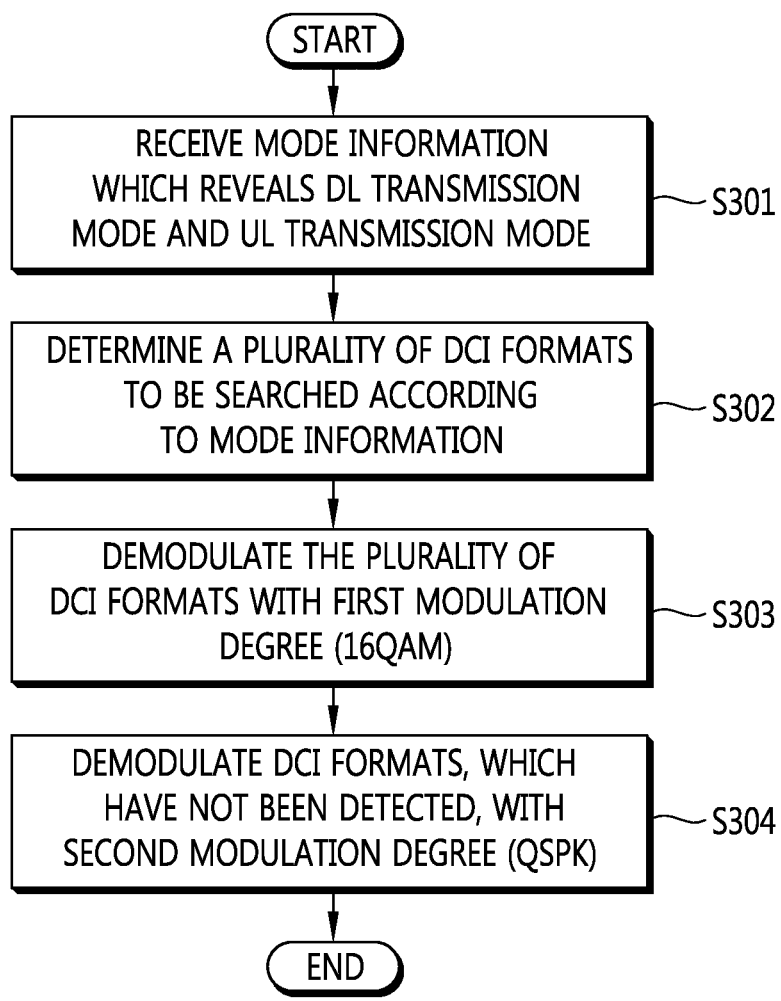
FIG. 12 shows a method of decoding E-PDCCH according to a third embodiment of the present invention.

FIG. 12 shows a method of decoding E-PDCCH according to a third embodiment of the present invention.

The UE receives mode information which reveals downlink transmission mode and uplink transmission mode (S301).

The UE determines a plurality of DCI formats which need to be searched according to mode information (S302), and the UE demodulates the plurality of DCI formats with the first modulation degree (e.g., 16QAM) (S302). Only when the plurality of DCI formats are not detected, the UE demodulates the DCI formats with the second modulation degree (e.g., QPSK) (S304).

Embodiment 4

The E-PDCCH may apply a 16QAM or higher modulation degree for the transmitted DCI format. At this time, a plurality of DCI formats may be bound with one DCI so as to be transmitted.

The E-PDCCH is allocated to the PDSCH region, and thus the usable resource region is widened, and an additional beamforming gain may also be obtained. Hence, the receiving SINR may be relatively high compared to the existing PDCCH.

Therefore, when a plurality of DCI formats defined for the existing PDCCH exist, a plurality of DCI formats may be placed adjacent for the same resource region, and one CRC may be added to the adjacent DCI formats so as to be transmitted. For example, two DCI formats in the existing PDCCH, which is modulated with QPSK, are modulated with 16QAM so as to be provided to one DCI.

Figure 13:
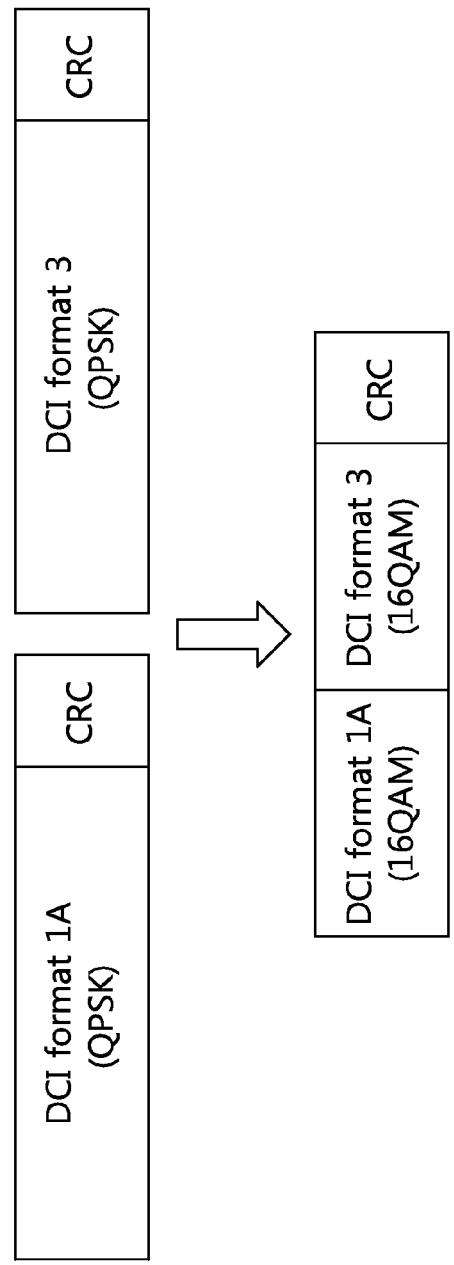
FIG. 13 shows an example of one multi DCI format by combining 2 existing DCI formats.

FIG. 13 shows an example of one multi DCI format by combining 2 existing DCI formats.

Referring to FIG. 13, two existing DCI formats, for example, DCI format 1A (including CRC) and DCI format 3 (including CRC) are modulated with QPSK in the existing method. One multi DCI format may be provided by modulating DCI format 1A and DCI format 3 with 16QAM. The two existing DCI formats may be DCI formats having the same payload size. For example, DCI formats 1A and 3 have the same payload size.

The payload size of the multi DCI format may be set to be the same as the payload size of the two existing DCI formats.

When DCI format is modulated with 16QAM or higher modulation degree and is then transmitted, the E-PDCCH may simultaneously transmit the existing DCI formats in one of the following schemes.

1) combining one or more DL grants (e.g., DCI format 1, 1A/1B/1C/1D, 2,2A, etc.) with one or more UL grants (e.g., DCI format 0, 4)

2) one or more DL grants 3) one or more UL grants

When transmitting the multi DCI format with 16QAM or higher modulation degree, the base station, the constitution of the multi DCI format may be notified by using the most significant bit (MSB) (1 bit) as an indicator. For example, if the bit value of the indicator is 0, it reveals that the multi DCI format is the combination of DL grant and UL grant, and if the bit value of the indicator is 1, it reveals that the DCI format is DL grant or UL grant. The UE check the constitution of the E-PDCCH through the indicator and may perform decoding operation for the E-PDCCH.

The present invention may be applied even when a new DCI format is introduced. Furthermore, embodiments 1 to 4 may be combined so as to be used. For example, according to embodiment 2, the modulation scheme is different from each DCI format, and thus the UE may apply different demodulation schemes (e.g., 16QAM, QPSK) for each DCI format. In this case, embodiment 4 may be combined. That is, the DCI format, which is modulated with 16QAM, may be the multi DCI format which is generated by combination of two existing DIC formats which are modulated with QPSK.

Up to now, a modulation method, which is applied when transmitting the E-PDCCH in the multi node system, and the E-PDCCH demodulation/decoding method of the UE have been described. When the multi node system reuses the DCI formats defined in the existing system, a high modulation degree may be applied. At the same time, the transmission of the multi DCI format is possible, and thus the resource efficiency may be enhanced while minimizing the additional blind decoding overhead increase.

Figure 14:
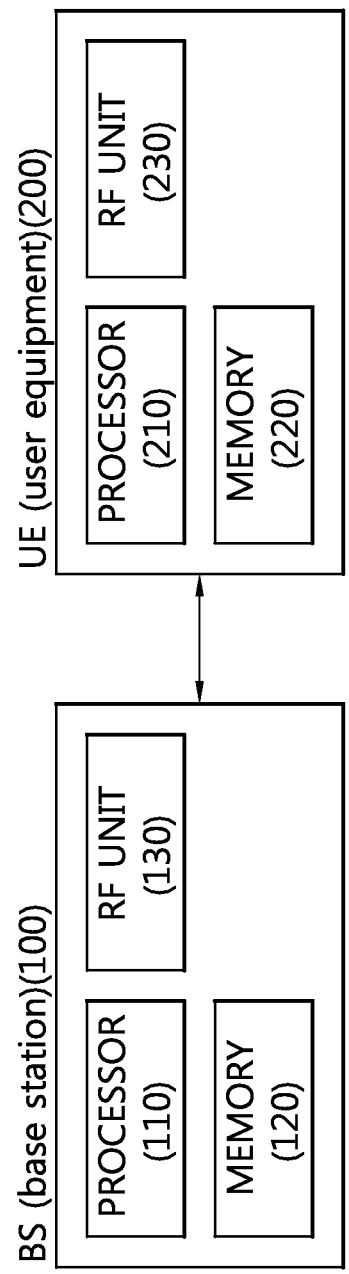
FIG. 14 is a block diagram illustrating a wireless device to which the embodiment of the present invention may be applied.

FIG. 14 is a block diagram illustrating a wireless device to which the embodiment of the present invention may be applied.

The base station 100 includes a processor 110, a memory 120, and a radio frequency unit (RF unit) 130. The processor 110 implements the suggested function, process, and/or method. Layers of the wireless interface protocol may be implemented by the processor 110. The memory 120 is connected to the processor 110 and stores various information sets for operating the processor 110. The RF unit 130 is connected to the processor 110 and transmits and/or receives wireless signals.

The UE 200 includes a processor 210, a memory, and RF unit 230. The processor 210 implements the suggested function, process, and/or method. Layers of the wireless interface protocol may be implemented by the processor 210. The memory 220 is connected to the processor 210 and stores various information sets for operating the processor 210. The RF unit 230 is connected to the processor 210 and transmits and/or receives wireless signals.

The processor 110 or 210 may further include an application-specific integrated circuit (ASIC), another chipset, a logic circuit and/or a data processing device. The memory 120 or 220 may include a read-only memory (ROM), a random access memory (RAM), a flash memory, a memory card, a storage medium, and/or another storage device. The RF unit 130 or 230 may include a baseband circuit for processing a wireless signal. When the embodiment is implemented by software, the above-described scheme may be implemented by a module (process, function, etc.) which performs the above described function. The module may be stored in the memory 120 or 220 and may be executed by the processor 110 or 210. The memory 120 or 220 may exist inside or outside the processor 110 or 210, and may be connected to the processor 110 or 210 by various well-known means.

What is claimed is:

1. A method of decoding a control channel of a user equipment (UE) in a multi-node system, the method comprising:
configuring a control channel, wherein the control channel is included within a data region of a control region, the control region including initial N orthogonal frequency division multiplexing (OFDM) symbols and the data region which includes remaining OFDM symbols in a subframe including a plurality of OFDM symbols,
wherein N is an integer having any one of the values from 0 to 4,
wherein the control channel is an enhanced physical downlink control channel (E-PDCCH);
decoding the E-PDCCH using a first aggregation level or a second aggregation level,
wherein the first aggregation level is used when the E-PDCCH is composed of one or two resource blocks, and the second aggregation level is used when the E-PDCCH is composed of 4 or 8 resource blocks,
wherein when the E-PDCCH is decoded with the first aggregation level, the E-PDCCH is demodulated by 16 quadrature amplitude modulation (16QAM), and when the E-PDCCH is decoded with the second aggregation level, the E-PDCCH is demodulated by quadrature phase shift keying (QPSK),
wherein blind decoding is first performed on the E-PDCCH demodulated by 16QAM, and then blind decoding is performed on the E-PDCCH demodulated by QPSK,
wherein a configuration of each of multiple DCI formats is represented by the most significant bit (MSB) of an indicator when the E-PDCCH is demodulated by 16QAM, and
wherein if the MSB of the indicator has a first value, each of the multiple DCI formats is configured with a combination of a downlink (DL) grant and an uplink (UL) grant, and if the MSB of the indicator has a second value, each of the multiple DCI formats is configured with the DL grant or the UL grant.

2. A user equipment (UE) for decoding a control channel in a multi-node system, the UE comprising:
a radio frequency (RF) unit which transmits and receives a wireless signal; and
a processor connected to the RF unit,
wherein the processor:
configures a control channel,
wherein the control channel is included within a data region of a control region, the control region including initial N orthogonal frequency division multiplexing (OFDM) symbols and the data region which includes remaining OFDM symbols in a subframe including a plurality of OFDM symbols,
wherein N is an integer having any one of the values from 0 to 4,
wherein the control channel is an enhanced physical downlink control channel (E-PDCCH);
decodes the E-PDCCH using a first aggregation level or a second aggregation level,
wherein the first aggregation level is used when the E-PDCCH is composed of one or two resource blocks, and the second aggregation level is used when the E-PDCCH is composed of 4 or 8 resource blocks,
wherein when the E-PDCCH is decoded with the first aggregation level, the E-PDCCH is demodulated by 16 quadrature amplitude modulation (16QAM), and when the E-PDCCH is decoded with the second aggregation level, the E-PDCCH is demodulated by quadrature phase shift keying (QPSK),
wherein blind decoding is first performed on the E-PDCCH demodulated by 16QAM, and then blind decoding is performed on the E-PDCCH demodulated by QPSK,
wherein a configuration of each of multiple DCI formats is represented by the most significant bit (MSB) of an indicator when the E-PDCCH is demodulated by 16QAM, and
wherein if the MSB of the indicator has a first value, each of the multiple DCI formats is configured with a combination of a downlink (DL) grant and an uplink (UL) grant, and if the MSB of the indicator has a second value, each of the multiple DCI formats is configured with the DL grant or the UL grant.

* * * * *